May 11, 1965  H. R. MOORE  3,183,465
TRANSPOSED WINDING FOR ELECTRICAL APPARATUS
Filed May 9, 1962  3 Sheets-Sheet 3

WITNESSES:
Bernard R. Gieguey
David H. Gould

INVENTOR
Harold R. Moore

BY F. E. Browder
ATTORNEY

United States Patent Office

3,183,465
Patented May 11, 1965

3,183,465
TRANSPOSED WINDING FOR ELECTRICAL APPARATUS
Harold R. Moore, Hamilton, Ind., assignor to Westinghouse Electric Corporation, East Pittsburgh, Pa., a corporation of Pennsylvania
Filed May 9, 1962, Ser. No. 193,388
3 Claims. (Cl. 336—187)

This invention relates to electrical apparatus, and more particularly to an arrangement of conductors in the windings of electrical inductive apparatus such as transformers.

The eddy current losses in the conductors of inductive electrical apparatus vary with the square of the dimension of the conductor at right angles to the direction of the leakage flux, as is well known. In an interleaved type of winding, this leakage flux is approximately at right angles to the axis of the winding or in the plane of the winding coils. Conventionally, the eddy current losses in an inductive apparatus such as a transformer have been reduced by decreasing the dimension of the conductor at right angles to the direction of the leakage flux by subdividing the required conductor area into two or more conducting elements or strands which are insulated from each other. Although this method reduces the eddy current losses in the winding of a transformer, there is an offsetting increase in the losses due to circulating currents between the parallel strands or subdivided conductor elements.

One method employed to reduce the losses resulting from circulating currents in a winding whose coils are formed from parallel strands or subdivided conductors is to transpose the relative position of the strands with respect to the direction of the leakage flux.

In one type of transposition, such as is disclosed in U.S. Patent No. 3,023,386 by Edward C. Wentz et al. and assigned to the assignee of the present application, a four-strand conductor is formed in two sections with each section of two parallel connected strands transposed with respect to their relative positions in the path of the magnetic leakage flux at a point approximately midway between their points of common connection. The latter method of transposition reduces the losses due to circulating currents in the winding but has the disadvantage of requiring that each coil be wound in two sections.

Another method of transposition, such as disclosed in U.S. Patent No. 1,872,274, which issued on an application of H. L. Cole et al., uses two parallel-connected strands from which the coils of a winding are formed and transposes the strands with respect to their relative positions in the path of the magnetic leakage flux at a point approximately midway between their points of common connection. The teachings of this invention reduce losses due to circulating currents in the winding when two strands or subdivided conducting elements are employed to form the coils of the winding. When, however, three or more strands or subdivided conducting elements are employed to form the coils of a winding, the latter method of transposition is inadequate to reduce the losses resulting from circulating currents to a low value, since the voltage induced between pairs of strands by the leakage flux will cause substantial losses due to circulating currents, and the transposition of the strands will in general be imperfect because some pairs of strands will be in a zone of different flux density after transposition. It is therefore, desirable to provide a winding for electrical apparatus including a plurality of coils formed from three or more strands or subdivided conducting elements in which losses due to circulating currents are reduced to a low value.

It is an object of this invention to provide a new and improved winding for electrical inductive apparatus.

Another object of this invention is to provide a new and improved winding for electrical apparatus including a plurality of coils formed from subdivided conductors or strands.

A further object of this invention is to obviate the need for winding the coils in sections.

Other objects of this invention will in part be obvious and will in part appear hereinafter.

For a fuller understanding of the nature and objects of the invention, reference should be had to the following detailed description taken in connection with the accompanying drawings, in which.

Figure 4:
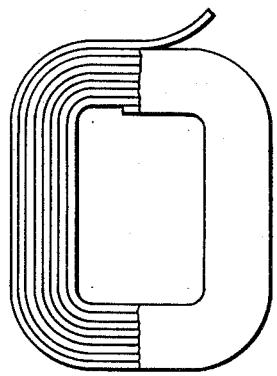
FIG. 4 is a plan view of a coil of the pancake type in which this invention may be employed.
Figure 5:
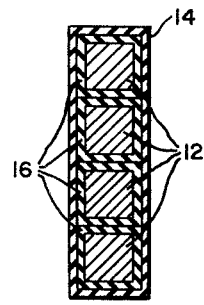
FIG. 5 is a cross-sectional view illustrating one arrangement of the strands or subdivided conductors and insulation from which the windings of the transformer shown in FIG. 1 may be formed.

Referring to FIG. 5 of the drawings, a pancake coil of the type shown in FIG. 4 may be formed from a main conductor comprising four strands or subdivided conducting elements 12. The strands 12 are each separately taped or wrapped with the insulation 16, and the insulated strands 12 are then taped or wrapped together with the insulation 14. The current carried by the coil shown in FIG. 4 is, therefore, divided among four strands or subdivided conducting elements which are divided transversely to the axis of the coil, the four strands being insulated from each other. The coil shown in FIG. 4 is, therefore, formed from a main conductor having four subdivided conducting elements of strands per layer as shown in FIG. 5 and may include as many layers per turn of the coil as required in a particular application. It will be understood that each strand may comprise a plurality of conducting filaments connected in parallel.

Figure 1:
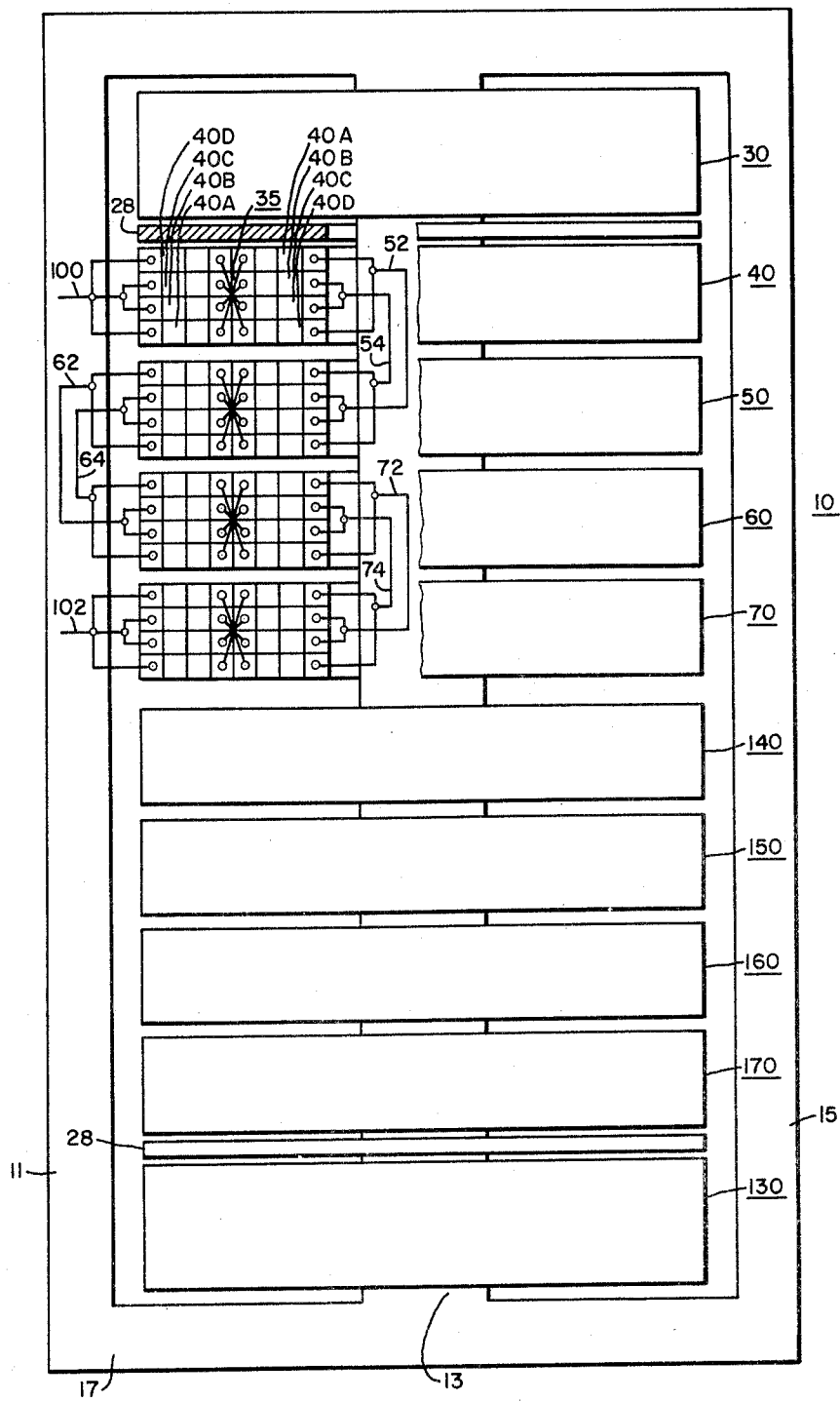
FIGURE 1 is a vertical, section view of the core and windings of a transformer showing the connections of the strands and the transposition thereof within the coils of said winding.

Referring to FIG. 1, there is illustrated a transformer 10 including a core member 17 having two windows formed by the outer leg members 11 and 15 and the middle or winding leg member 13. The windings of the transformer 10 include a plurality of coils connected in groups. The high voltage or primary winding of the transformer 10 includes a first group of coils 40, 50, 60 and 70 and a second group of coils 140, 150, 160 and 170. The low voltage or secondary winding of the transformer 10 includes a first plurality of coils 30 and a second plurality of coils 130 which are separated by the high voltage winding of transformer 10. Insulating washers 28 are provided between the high and low voltage coils. The first and second pluralities of low voltage coils 30 and 130 may each include one or more groups of coils as described hereinafter in connection with the high voltage winding. The coils included in the high and low voltage windings of the transformer 10 are of the pancake or flat disk type shown in FIG. 4, each of said coils being formed of at least three or more subdivided conducting elements or strands divided transversely with respect to the axis of the respective coils.

In particular, the first group of high voltage coils 40, 50, 60 and 70 are connected between the terminals 100 and 102. The high voltage coil 40 is composed of outer coil sections 40A and 40D which are electrically connected at the ends of the coils and are insulated through the coils, and inner coil sections 40C and 40B which are also electrically connected at the ends of the coils and are insulated through the coils. Similarly, the high voltage coils 50, 60 and 70 each include two outer and inner coil sections which are electrically connected at the ends of the coils 50, 60 and 70 and electrically insulated through the coils 50, 60 and 70. The coil strands 40A, 40B, 40C and 40D are divided transversely with respect to the axis of the coil 40. The strands 40A, 40B, 40C and 40D are transposed as indicated at 35 at a point approximately midway between the points of common connection of the strands 40A, 40B, 40C and 40D. The strands 40A, 40B, 40C and 40D are transposed longitudinally with respect to the axis of the high voltage coil 40 or are transposed with respect to their relative positions in the path of the leakage magnetic flux whose direction is approximately at right angles to the axis of the coil 40 or substantially parallel to the plane of coil 40.

It is to be noted that the strand 40A is above strand 40D for approximately one half of the length of the coil 40 and in the reverse position for the balance of coil 40. In a similar manner, the strand 40B is above strand 40C for one half of the length of the coil 40 and in the reverse position for the balance of the coil 40. It is to be understood that additional sets of four strands each may be provided in each coil in a particular application to provide the required current rating. The high voltage coils 50, 60, and 70, respectively, similarly are composed of insulated strands or subdivided conductors transposed in similar fashion to the strands of the high voltage coil 40.

In general, the high voltage coils 40, 50, 60 and 70 are connected in parallel paths between the terminals 100 and 102, the parallel paths forming a closed loop which includes all of the high voltage coils 40, 50, 60 and 70 which comprise the first group of high voltage coils. In particular, the first parallel path between the terminal 100 and the terminal 102 includes the series circuit which can be traced from the terminal 100 starting at the outside end of coil 40 through the outer conductors 40A and 40D of the coil 40 and the conductor 52 to the right or inside end of the coil 50, through the inner two conductors of coil 50 and the conductor 64 to the left or outside end of the coil 60, through the outer two conductors of coil 60 and the conductor 72 to the right or inside end of coil 70, and through the inner two conductors of coil 70 to the terminal 102. The second parallel path between the terminal 100 and the terminal 102 includes the series circuit which can be traced from the terminal 100 starting at the outside end of coil 40 through the inner two conductors 40C and 40B of coil 40 and the conductor 54 to the right or inside end of the coil 50, through the outer two conductors of coil 50 and the conductor 62 to the left or outside end of coil 60, through the inner two conductors of coil 60 and the conductor 74 to the right or inside end of coil 70, and through the outer two conductors of coil 70 to the terminal 102. One end of each of the inner and outer pairs of conductors of the terminal coils 40 and 70 is connected to one of the respective common terminals 100 or 102. The inner conductors of the intermediate coils 50 and 60 are connected to the outer conductors of the adjacent coils and the outer conductors of the intermediate coils are connected to the inner conductors of the adjacent coils. It is to be noted that the second group of high voltage coils 140, 150, 160 and 170 would be disposed and connected similarly to high voltage coils 40, 50, 60 and 70. It is also to be understood that the method of transposition disclosed could also be applied to the portions of the low voltage windings 30 and 130 which may each include one or more groups of coils.

It is to be noted that the internal transpositions of the outer pair and the inner pair of strands of the high voltage coils 40, 50, 60 and 70 as at 35 of coil 40 substantially eliminate circulating currents caused by the voltage induced between the strands of each pair of subdivided conductors in each coil. The transpositions of the inner and outer pairs of strands, however, do not eliminate circulating currents resulting from the voltage induced between the inner and outer pairs of strands which comprise each of the high voltage coils 40 through 70 by the magnetic leakage flux. The voltage induced between the inner and outer pairs of strands of each coil is due to the magnetic leakage flux between the pairs of strands and the physical separation of the inner and outer pairs of strands which make up each of the high voltage coils 40 through 70.

Figure 2A:
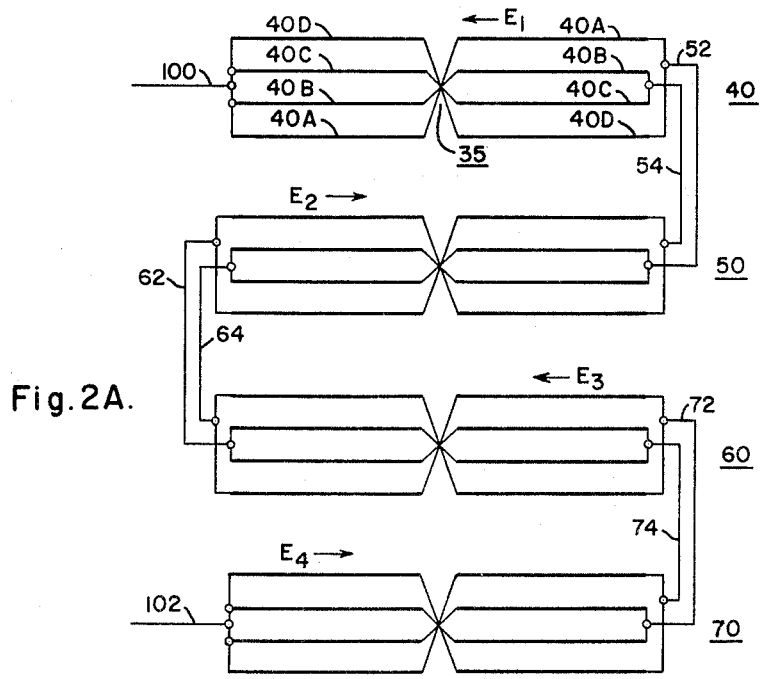
FIG. 2A is a diagrammatical representation of a portion of the windings of the transformer shown in FIG. 1 illustrating how the circulating currents in the windings are reduced to a low value.
Figure 3:
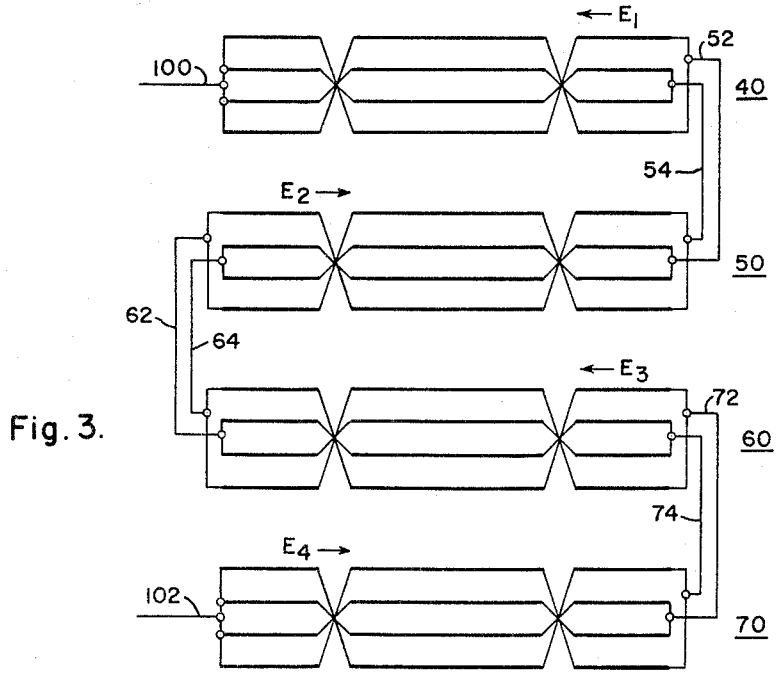
FIG. 3 is a diagrammatical representation of a modification of the winding of FIG. 2A to reduce the circulating currents still further.
Figure 2B:
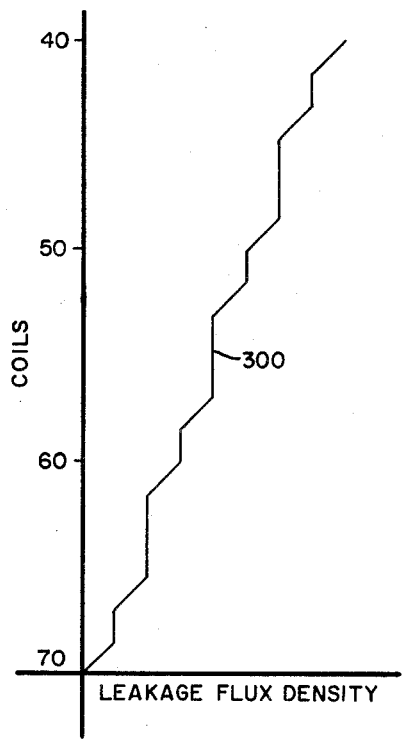
FIG. 2B is a graphic illustration of the variation of the leakage flux density in the different coils of the windings shown in FIG. 2A.

Referring now to FIGS. 2A and 2B, it is to be noted that the direction of the leakage flux induced voltages in $E_1$, $E_2$, $E_3$, and $E_4$, in the high voltage coils 40 through 70 is opposite to the voltage induced in the adjacent coils because of the manner in which the ends of the respective coils are connected to the ends of the adjacent cols, that is, the inside ends of the pairs of each coil are connected to the inside ends of the pairs of one adjacent coil, and the outside ends of the pairs of the same coil are connected to the outside ends of the pairs of the other adjacent coil. It is also to be noted that the magnitude of the voltage induced in each of the high voltage coils 40 through 70 by the leakage flux also varies from coil to coil because of the variation in the leakage flux density as will be explained hereinafter.

Referring to FIGS. 2A and 2B, the manner in which the method of transposition and interconnection of the coils reduces losses due to circulating currents will now be described.

FIG. 2A illustrates diagrammatically the coils 40, 50, 60 and 70 that are shown also in FIG. 1. Coil 40 is comprised of conductors 40A, 40B, 40C, and 40D. Coil 40 is transposed at a point approximately equidistant from its extremities.

FIG. 2B illustrates how the leakage flux density varies from a minimum at coil 70 to a maximum at coil 40.

It will be noted that in coil 40, conductors 40A and 40D are perfectly transposed, i.e., conductors 40A and 40D enclose the same magnitude of leakage flux both before and after transposition. Conductors 40B and 40C are likewise perfectly transposed, hence there will be essentially no circulating currents between conductors 40A and 40D or 40B and 40C. However, conductors 40D and 40C are not perfectly transposed with respect to one another because they enclose a different magnitude of leakage flux before and after transposition. Conductors 40A and 40B are likewise imperfectly transposed. Because of this necessarily imperfect transposition there will be a voltage induced between conductors 40D and 40C and between conductors 40A and 40B. No appreciable circulating currents will flow however, because the conductors of coil 40 are insulated from each other throughout the coil and conductors 40D and 40C as well as conductors 40A and 40B are kept separated on the right-hand side of coil 40 by the interconnection of conductor 40A to conductor 40D and conductor 40B to conductor 40C.

It will be understood that while coil 40 has been treated in detail, other coils of the transformer, such as coils 50, 60 and 70, are also similarly transposed and interconnected.

In FIG. 2A, there is illustrated diagrammatically the internal transitions of the coil pairs of the high voltage coils 40 through 70 and the external interconnection of the pairs of said high voltage coils. $E_1$ represents the voltage induced between the inner and outer pairs of coil 40 assuming the voltage at the inner pair 40B and 40C is at zero potential. Similarly, $E_2$, $E_3$ and $E_4$ represents the voltages induced between the inner and outer coil pairs of the high voltage coils 50, 60 and 70, respectively, by the leakage magnetic flux.

Referring to FIG. 2B, there is illustrated by the curve 300 the manner in which the leakage magnetic flux density varies from the high voltage coil 70 to the high voltage coil 40. Because of the variation in the leakage flux density as shown in FIG. 2B, the effect of the induced voltage between the inner and outer pairs of each coil must be considered. In FIG. 2A, $E_1$ represents the induced voltage between inner and outer pairs in coil 40, similarly, $E_2$ represents the induced voltage between pairs in coil 50, $E_3$ represents the induced voltage between pairs in coil 60 and $E_4$ represents the voltage induced between pairs in coil 70. In general, the induced voltage between the inner and outer pairs of each coil is independent of the leakage magnetic flux density generated by other coils or another group of coils and is dependent only on the leakage magnetic flux density generated by the current flow and turns in each coil. Referring again to FIG. 2A, the induced voltage $E_1$ in coil 40 is independent of the leakage magnetic flux density generated by coils 50, 60 and 70. There may be cases in practice where the magnitude of the induced voltage between inner and outer pairs of a 4-wide coil may be dependent on the leakage magnetic flux density generated by other coils or groups of coils, but these cases are not usually encountered.

Referring again to FIG. 2A, the strand pairs of the high voltage coils 40 through 70 are interconnected to form a closed loop as can be seen by tracing the series circuit starting at terminal 100 on the outside end of coil 40, through the inner pair of strands of coil 40 and the conductor 54, through the outer pair of strands of coil 50 and the conductor 62, through the inner pair of strands of coil 60 and the conductor 74, through the outer pair of strands of coil 70 to the left or outside end of coil 70, through the inner pair of strands of coil 70 and the conductor 72, through the outer pair of strands of coil 60 and the conductor 64, through the inner pair of strands of coil 50 and the conductor 52, through the outer pair of strands of coil 40 to the terminal 100 on the outside end of coil 40. Since this closed loop so arranged that in each coil the outside pair of strands and the inside pair of strands are traversed in opposite directions, the total induced voltage in the closed loop just traced will be approximately equal to zero or to a very low value. If the total induced voltage is not equal to zero, the circulating current in the closed loop just described will be equal to the net induced voltage divided by the effective resistance of all the coil strand pairs of the high voltage coils 40 through 70 which make up the closed loop, considered as a series circuit. Therefore, even if there is a small net induced voltage in the closed loop, the circulating current will be held to a low value by the resistance of the closed loop.

In summary, the winding for electrical apparatus as disclosed substantially eliminates or reduces circulating currents and the associated losses by transposing each inner and outer pair of strands of the coil included in each winding and interconnecting the inner and outer pairs of strands in each coil so that the induced voltages between the inner pairs of strands and the outer pairs of strands of the coils oppose each other. The interconnections also take into account the variation in the magnitude of the induced voltage in the different coils.

It is to be noted that the starting and finishing terminals 100 and 102, respectively, of the first group of high voltage coils 40 through 70 may be connected to carry current from or to additional groups of high voltage coils such as the second group of high voltage coils, which includes the coils 140, 150, 160 and 170. The method of transposition and interconnections described take advantage of the fact that the induced voltages between the inner and outer pair of strands in adjacent coils in each group are of opposite directions because of the manner in which the ends of the pairs of inner and outer strands of adjacent coils are connected as previously described. Since the closed loop in which the circulating current might otherwise flow, includes the strand pairs of a plurality of coils, circulating current is also held to a minimum as previously mentioned because of the effective resistance of the various coil strand pairs included in each closed loop.

Referring again to FIG. 2A, the connections at the ends of the coils may vary depending on the characteristics of the design. If $E_1$ in coil 40 is equal to or approximately equal to $E_2$ in coil 50 and $E_3$ in coil 60 is equal to or approximately equal to $E_4$ in coil 70, connections 62 and 64 can be connected together to form a solid connection. Tracing the loop from 100 on the outside end of coil 40 through the inner pairs of strands of coil 40 and the conductor 54, through the outer pair of strands of coil 50 and the now solid connection 62–64 through the inner pair of strands of coil 50 and the conductor 52, through the outer pairs of strands of coil 40 to the terminal 100 on the outside end of coil 40, the total induced voltage in the closed loop will be $E_1$ minus $E_2$ which will be zero or near zero. A similar analysis can be made for the closed loop between the now solid connection 62–64 and connection 102. Therefore, the teachings of this invention can be applied to any plurality of coils. The maximum benefit, however, would be obtained by connecting two coils or a multiple of two coils in accordance with the teachings of the invention.

It is to be noted that each of the coils is of the pancake type in the winding as disclosed and can be wound and insulated separately, the coils may then be assembled into coil groups as disclosed.

It is to be understood that each pair of strands of a coil as disclosed may include more than two conductors or subdivided current carrying elements as required in a particular application. A coil of the type disclosed includes at least two pairs of strands but may include any plurality of pairs of strands. In other words, a coil of the type disclosed may include any number of conductors per layer, preferably a multiple of four strands per layer. In addition, a group of coils in the winding of the type disclosed may include any plurality of coils. Although illustrated with an even number of coils in a group, the invention may be employed with an odd number of coils in each group, the interconnections of the strands of the coils being suitably modified in accordance with the teachings of the invention. Although the invention has been described as applied to rectangular coils of the pancake type or flat disk type, it may also be applied to coils having generally circular shape or to any form of winding in which the leakage flux is parallel to the plane of the coils.

A winding for an electrical inductive apparatus, such as a transformer incorporating the teachings of this invention, has several advantages, for example, for a particular quantity of conductive material, such as copper, in the windings of the apparatus, the efficiency of the apparatus is increased by reducing the eddy current losses and reducing the circulating current resulting from the use of a conductor including a plurality of strands. On the other hand, in order to provide apparatus having a predetermined efficiency or value of losses due to eddy currents and circulating currents, the amount of conductor material may be reduced, hence a winding incorporating the teachings of this invention has small losses due to eddy currents and circulating currents compared to windings of the same type employed in the past. In addition, the connections of the ends of the pairs of strands in the coils in the winding, as disclosed, are conveniently made to the nearest ends of the coil strands in the adjacent coils rather than extending across the base of the coils which would lengthen the connecting conductors and be less convenient during assembly of a winding. In general, the winding disclosed can be used for inductive apparatus at a higher rating in order to provide the necessary current carrying capacity or in an apparatus of lower ratings to reduce the eddy current losses by using a larger number of narrow subdivided conductors rather than a smaller number of wider conductors. In other words, the winding disclosed reduces eddy current losses by increasing the number of strands or subdivided conductors from which the coils of the winding are formed while using the same amount of conducting material. Therefore, the effective width of the strands or the subdivided conductors at right angles to the direction of the leakage flux is reduced to thereby reduce the eddy current losses in the winding while still holding the circulating current losses to a very low value.

Since numerous changes may be made in the above-described apparatus and different embodiments may be made without departing from the spirit thereof, it is intended that all the matter contained in the foregoing description or shown in the accompanying drawing shall be interpreted as illustrative and not in a limiting sense.

I claim as my invention:

1. A winding for electrical inductive apparatus comprising a plurality of flat disc type coils, each of said coils including a conductor comprising four electrically insulated strands, said four strands including two parallel-connected outer strands and two parallel-connected inner strands, said four strands being connected together at the start and finish of said winding, said four strands being transposed at least once in each of said coils, said transposition reversing the sequence of said strands, the outer two strands being connected together at each end of each coil, the inner two strands being connected together at each end of each coil, said coils being connected by conductors joining the inner strands of each coil to the outer strands of each adjacent coil and conductors joining the outer strands of each coil to the inner strands of each adjacent coil.

2. A winding for electrical inductive apparatus comprising a plurality of flat disc type coils, said coils each including a conductor comprising two pairs of parallel connected electrically insulated strands, each pair of strands having points of common connection at each end of each of said coils, said pairs of strands comprising an inner pair of strands and an outer pair of strands, said strands being arranged along a path substantially at right angles to the path of leakage magnetic flux caused by current flowing in said coils, each of said pairs of strands being transposed with respect to their relative position in said leakage magnetic path at a point substantially midway between their points of common connection, all of said strands having a point of common connection at the start and finish of said winding, said coils being connected by conductors joining the inner pair of strands of each coil to the outer pair of strands of each adjacent coil and conductors joining the outer pair of strands of each coil to the inner pair of strands of each adjacent coil so that in each coil no closed electrical circuit for circulating currents is presented between said inner and outer pairs of strands.

3. A winding for electrical inductive apparatus to minimize the effect of circulating currents due to leakage magnetic flux comprising a plurality of flat disc type coils, said coils each including a conductor comprising four electrically insulated strands, said strands comprising two outer strands and two inner strands, said strands being so joined at each end of each coil that the outer two strands are connected in parallel and the inner two strands are also connected in parallel, the strands of said conductor being arranged transverse to the axis of said coils, each of said coils being transposed longitudinally of the axis of said coils at least once, said transpositions reversing the sequence of strands along the axis of said coil so that the two inner strands and the two outer strands are perfectly transposed with respect to each other by enclosing the same leakage magnetic flux before and after transposition, said four strands being connected together at the start and finish of the winding, said coils being connected by conductors joining the inner strands of each coil to the outer strands of each adjacent coil and conductors joining the outer strands of each coil to the inner strands of each adjacent coil so that in each coil circulating currents are prevented from flowing between the inner and outer strands of said conductor.

References Cited by the Examiner

UNITED STATES PATENTS

| | | | |
|---|---|---|---|
| 2,441,804 | 5/48 | Farry | 336—187 |
| 2,710,380 | 6/55 | Buda | 336—187 |
| 3,023,386 | 2/63 | Went et al. | 336—187 |

FOREIGN PATENTS

| | | |
|---|---|---|
| 210,648 | 5/56 | Australia. |

JOHN F. BURNS, *Primary Examiner.*